(12) United States Patent
Baek et al.

(10) Patent No.: US 7,664,870 B2
(45) Date of Patent: Feb. 16, 2010

(54) METHOD AND SYSTEM FOR PROVIDING USERS A LOWER FIDELITY ALTERNATIVE UNTIL A HIGHER FIDELITY EXPERIENCE IS AVAILABLE

(75) Inventors: Diane Baek, Redmond, WA (US); Peter W. Blois, Kirkland, WA (US); Andrew Shebanow, San Jose, CA (US); Kenneth Wolfe, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 625 days.

(21) Appl. No.: 11/067,596

(22) Filed: Feb. 25, 2005

(65) Prior Publication Data

US 2006/0195507 A1 Aug. 31, 2006

(51) Int. Cl.
*G06F 15/16* (2006.01)
(52) U.S. Cl. .................... 709/231; 709/203; 709/206
(58) Field of Classification Search ................. 345/419, 345/422–428, 582, 667; 382/239, 276–309; 705/3; 709/203, 205, 206, 231
See application file for complete search history.

(56) References Cited

U.S. PATENT DOCUMENTS

| 5,737,599 | A * | 4/1998 | Rowe et al. .................. 707/10 |
| 6,091,422 | A * | 7/2000 | Ouaknine et al. ........... 345/419 |
| 6,128,021 | A * | 10/2000 | van der Meulen et al. ... 345/428 |
| 6,545,687 | B2 * | 4/2003 | Scott et al. .................. 345/629 |
| 6,775,678 | B1 * | 8/2004 | Hillberg et al. ............. 707/102 |
| 7,139,794 | B2 * | 11/2006 | Levanon et al. ............. 709/203 |
| 7,206,804 | B1 * | 4/2007 | Deshpande et al. ......... 709/203 |
| 7,260,651 | B2 * | 8/2007 | Parrella et al. ............. 709/247 |
| 7,269,626 | B1 * | 9/2007 | Nguyen ...................... 709/206 |
| 7,369,515 | B2 * | 5/2008 | Salesky et al. .............. 370/260 |
| 7,433,546 | B2 * | 10/2008 | Marriott et al. ............. 382/305 |
| 7,483,953 | B2 * | 1/2009 | Sakamoto et al. ........... 709/207 |
| 2002/0032677 | A1 * | 3/2002 | Morgenthaler et al. ......... 707/3 |
| 2002/0126135 | A1 * | 9/2002 | Ball et al. .................... 345/600 |
| 2003/0009579 | A1 * | 1/2003 | Kawai et al. ................ 709/231 |
| 2003/0078964 | A1 * | 4/2003 | Parrella et al. ............. 709/203 |
| 2004/0120589 | A1 * | 6/2004 | Lopresti et al. ............. 382/239 |
| 2004/0167806 | A1 * | 8/2004 | Eichhorn et al. ............... 705/3 |
| 2005/0265345 | A1 * | 12/2005 | Chen et al. .................. 370/392 |
| 2006/0023969 | A1 * | 2/2006 | Lara et al. ................... 382/309 |
| 2006/0031558 | A1 * | 2/2006 | Ortega et al. ............... 709/232 |
| 2006/0179153 | A1 * | 8/2006 | Lee et al. .................... 709/231 |

\* cited by examiner

*Primary Examiner*—William C. Vaughn, Jr.
*Assistant Examiner*—Greg Bengzon
(74) *Attorney, Agent, or Firm*—Perkins Coie LLP

(57) ABSTRACT

A method for providing a low fidelity alternative until a high fidelity experience becomes available is provided. Upon detecting a need to download data, a download manager determines a download priority for downloading the data. The download priority specifies an amount of a low fidelity representation of data to download prior to downloading a high fidelity representation of the same data and any remaining low fidelity representation of the data simultaneously. The download manager then downloads, for example, from a content server, the low fidelity representation of the data and the high fidelity representation of the data according to the determined download priority, thus allowing the low fidelity representation of the data to be used until the high fidelity representation of the data is downloaded and becomes available.

15 Claims, 4 Drawing Sheets

METHOD AND SYSTEM FOR PROVIDING USERS A LOWER FIDELITY ALTERNATIVE UNTIL A HIGHER FIDELITY EXPERIENCE IS AVAILABLE

TECHNICAL FIELD

The described technology is directed generally to access of documents and, more particularly, to techniques for providing a lower bandwidth, lower fidelity alternative until the higher fidelity experience provided by a document is available.

BACKGROUND

The proliferation of computers and the advent of the Internet, and in particular, the maturing of the World Wide Web ("web"), has made the exchange of multimedia data, such as text, audio, video, etc., commonplace and ever increasing. The multimedia data is typically stored in one or more files on a server, and subsequently download to clients over a network connection.

The multimedia data is distributed as either "streaming" or "non-streaming" data. With streaming multimedia data, the data can be delivered or used in real-time as it is being received, and thus, avoids the delay associated with downloading the entire file and then playing or using the contents. Conversely, with non-streaming multimedia data, the entire file has to be received first before the data can be used.

One drawback to downloading non-streaming files over a network, such as the Internet, is the relatively limited bandwidth that is available to an application program. Because the limited bandwidth directly affects and limits the amount of information that may be transmitted from a server to a client in a given period of time, it may take a very long period of time to completely download a non-streaming multimedia file. Thus, a user at a client computer that is downloading the non-streaming multimedia data over the Internet may not be able to experience the multi-media content for a long period of time. For example, a collaboration application may provide presenters the ability to share documents or other multimedia data with other participants in a collaboration session. When a presenter chooses to share a document or other data, the data is first placed on a central server as a non-streaming file, and subsequently downloaded to the clients—i.e., the participants' computers—in order to be shared. Depending on the size of the file, the download may take many seconds or even minutes. Because the collaboration programs on the clients that are downloading the non-streaming files are not able to use the data in real-time, the meeting participants will have no sharing experience until the download completes.

It would be desirable to have a technique that allows users at client machines to experience data stored on a server machine without requiring the entire data file to be first downloaded to the client machine.

DETAILED DESCRIPTION

Figure 1:
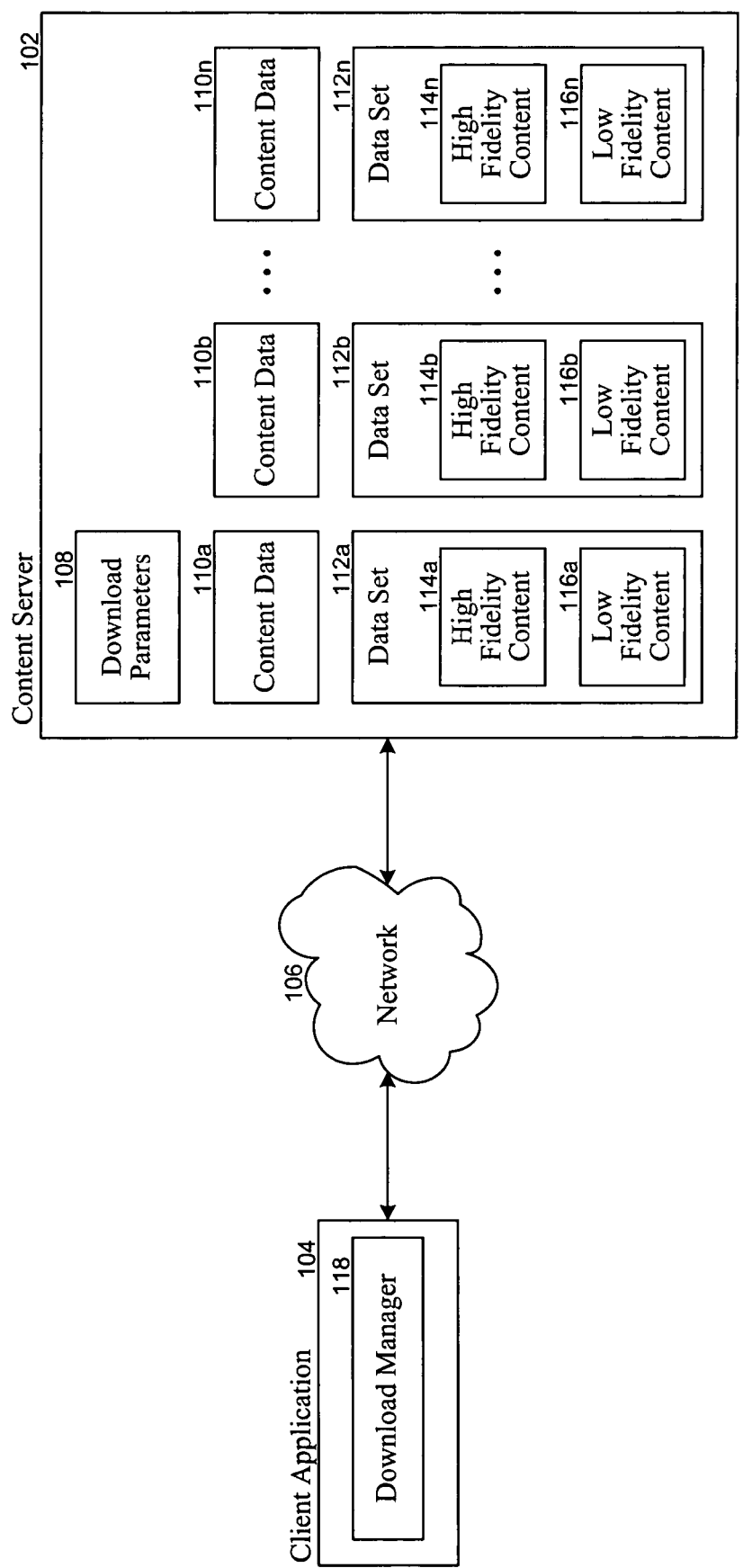
FIG. 1 is a high-level block diagram showing an environment in which a download manager may operate.

A method and system for providing a lower fidelity alternative until a higher fidelity experience is available is provided. The term "fidelity" as used herein generally refers to the degree of quality or reproduction. For example, data that is low fidelity is of lower quality than data that is of high fidelity. Accordingly, data that is of lower fidelity typically requires less bandwidth than the same data that is of a higher fidelity. In one embodiment, a download manager monitors client download performance to dynamically determine whether or not to provide a user a lower bandwidth/lower fidelity alternative to a high bandwidth/high fidelity data until the higher bandwidth/higher fidelity experience is available. The download manager may execute as a component of a client application, such as a collaboration client application, a web browser application, or other applications that interact with a content server to obtain data, typically for presentation to or viewing by a user of the client application. The content server provides for download multiple representations of the same data in datasets. Each dataset contains a representation or multiple representations of the same data, but at different qualities or fidelities, for downloading and use by the client application. The data may be text, image, multimedia, audio, video, and any other data format, and is typically provided in a document suitable for use by the client application.

During execution of the client application, the download manager may receive an indication or may detect a need to download content—i.e., data—from the content server. Upon identifying the content to download, the download manager may determine whether the high fidelity version or representation of the content should even be downloaded. For example, the communication channel between the client application and the content server may not be suitable for downloading the high fidelity content from the content server to the client application. If the download manager determines that the high fidelity content is to be downloaded, the download manager may further determine whether it should even consider downloading the low fidelity version or representation of the content prior to the high fidelity content in order to provide the client application and, in turn, the user of the client application the low fidelity content until the high fidelity content is downloaded onto the client and available for use by the client application. For example, the download manager may determine that the difference in quality or the bandwidth required in downloading the low fidelity content and the high fidelity content does not warrant downloading the low fidelity content.

If the download manager determines that the low fidelity content and the high fidelity content is to be downloaded, the download manager prioritizes the download sequence—i.e., the downloading of the low fidelity content and the high fidelity content. For example, the content server may provide for downloading by the client application a dataset having a MICROSOFT POWERPOINT slide deck with 5 slides (high fidelity) and 5 portable network graphics (PNG) images (low fidelity) representing the 5 slides. Upon determining that both the low fidelity and the high fidelity representation of the data—i.e., the slide deck—is to be downloaded, the download manager may prioritize the download sequence as to download an amount of the low fidelity content—e.g., the first PNG image—followed by the high fidelity content and the remainder of the low fidelity content simultaneously—e.g., slide deck (the 5 slides) and the remaining PNG images simultaneously. The high fidelity content is typically one item—e.g., a file or document containing the slide deck with 5 slides—which is non-streamable, and the low fidelity content is typically a multiple number of items—e.g., 5 files or documents, each containing one of the 5 images. Since there are a multiple number of low fidelity content items, the low fidelity content items can be used by the client application as they are downloaded. Stated differently, the client application is able to download and use a certain amount of the low fidelity content—e.g., a certain number of the low fidelity content items—without having to download all of the low fidelity content. Conversely, all of the high fidelity content needs to be downloaded prior to use by the client application.

In one embodiment, the download manager can monitor the client application to determine various "use factors" regarding the client application's use of the content. The use factors may indicate, for example, that the client application is actively processing and/or using the content, that the client application is planning on using the content, that the client application is presenting the content for previewing, that the client application is considering using the content, and other use of the content by the client application. The download manager can then consider the use factors in prioritizing the download sequence. For example, if the client application is actively using the content, the download manager may assign a greater weight or priority to the low fidelity representation of the content that is actively being used by the client application and a lower weight to the high fidelity representation of the content. The assigned weights may be one factor in determining the amount of low fidelity content to download before starting the download of the high fidelity content and the remaining low fidelity content. In other embodiments, the download manager may consider other parameters, such as the available bandwidth, the size of each item of low fidelity content, the size of the high fidelity content, and the like, along with the use factors in prioritizing the download sequence. Thus, the client application will be able to provide its user the low fidelity alternative to the content without having to wait for the high fidelity representation of the content to download. In another example, if the client application will be storing the content for later use, the download manager may assign a lower weight or priority to the low fidelity representation of the content and a higher weight to the high fidelity representation of the content.

One skilled in the art will appreciate that the use factors and the weightings are client application specific and may vary from application to application. For example, some applications may not provide a previewing feature. In these applications, a use factor will not indicate that the client application is presenting the content for previewing. One skilled in the art will also appreciate that the weights assigned to the various representations of the data in the dataset may also be based on the type of data. For example, even though the download manager determines that the client application is actively using the content, the download manager may assign different weights depending on whether the content is a text document (high fidelity) and a corresponding number of images for each page in the text document (low fidelity), or a slide presentation (high fidelity) and a corresponding number of images for each slide in the slide presentation (low fidelity).

In one embodiment, the download manager may maintain a copy of the downloaded content in a cache. The cache may have a size limit, and the download manager may keep track of the memory used by the cache and purge the oldest content in order to not exceed the size limit. The download manager can then check the cache to determine if a local copy of the content is available prior to downloading the content from the content server, and only download the content if it is not in the cache.

In one embodiment, the download manager may monitor and manage the downloading of the content. For example, the download manager may cease the downloading of the low fidelity content if the high fidelity content is downloaded and available for use, for example, by the client application.

One skilled in the art will appreciate that many variations of the download manager are available. For example, instead of monitoring the client application to determine the use factors, the download manager may prioritize the download sequence using configurable parameters which may indicate the amount of low fidelity content to download prior to starting the downloading of the high fidelity content and the remaining low fidelity content, the amount of low fidelity content to download that is based on the available bandwidth, and the like. Moreover, some or all of the parameters may be provided by the client application and/or the content server application. In another example, the download manager may always attempt to download the high fidelity representation of the content.

The various embodiments of the download manager and their advantages are best understood by referring to FIGS. 1-4 of the drawings. The elements of the drawings are not necessarily to scale, emphasis instead being placed upon clearly illustrating the principles of the invention. Throughout the drawings, like numerals are used for like and corresponding parts of the various drawings.

FIG. 1 is a high-level block diagram showing an environment in which a download manager may operate. The environment is only one example of a suitable operating environment and is not intended to suggest any limitation as to the scope of use or functionality of the download manager. As depicted, the environment comprises a content server 102 and a client application 104 coupled to a network 106. The content server may host a server application counter part to the client application, and generally provides the content for downloading and use by the client application. By way of example, the content server is illustrated as comprising download parameters 108, content data 110a-110n and their corresponding datasets 112a-112n. Each of the datasets 112a-112n is further illustrated as comprising high fidelity component 114a-114n and low fidelity component 114a-114n, respectively.

The download parameters are downloaded to the client application and used by the download manager to determine whether to download the high fidelity and/or the low fidelity content, and the download priority. For example, the server application may send the download parameters to a client application when the client application establishes a connection to the server application. These parameters specify information, such as, a minimum kilobytes per second to be considered a high bandwidth connection, a maximum size for the cache or multiple caches maintained by the download manager, a maximum number of worker threads allowed to be used by the download manager to download the content, a maximum number or amount of low fidelity content to download before starting the download of the high fidelity content, a weighting factor that specifies the amount by which the high fidelity content needs to exceed the first low fidelity content in size in order to download both the low and high fidelity content, and the like. In some embodiments, some or all of the parameters may be optional, and omitting the parameters may cause the download manager to use default values for the omitted parameters.

The content data comprises information regarding each of the datasets, and is downloaded to the client application for use by the download manager. For example, when the client application establishes a connection to the server application, the server application may be able to determine the datasets that may be downloaded by the client application, and send the content data corresponding to these datasets to the client application. By way of example, assuming that the application is a collaboration application, when the client application connects to the server application to join a specific collaboration session, the server application may be able to determine the datasets associated with the specified collaboration session and thus, send the content data corresponding to the datasets to the client application.

Content data may specify information that describes the content in a corresponding dataset, such as the type of the high fidelity content, the size of the high fidelity content, the type of the low fidelity content, the number of units of the low fidelity content, the size of each unit of the low fidelity content. For example, the content data for a particular dataset may indicate that the high fidelity content is a POWERPOINT presentation of 15,000 KB, and that the low fidelity representation of the high fidelity content is 25 PNG images, each image representing a slide and being 100 KB. In another example, the content data for another dataset may indicate that the high fidelity content is a WORD document of 10,000 KB, and that the low fidelity representation of the high fidelity content is 100 PNG images, each image representing a page in the document and being 50 KB.

Each dataset comprises multiple representations of the same data, but at different qualities or fidelities, for downloading and use by the client application. By way of example, each dataset in FIG. 1 is shown as comprising two representations of the same data, a high fidelity content representation, such as WORD, POWERPOINT, etc., and a low fidelity content representation, such as PNG, thumbnails, etc. The high fidelity representation of the data is typically comprised of one item, for example, one WORD document, one POWERPOINT file, and the like. The low fidelity representation of the same data is typically comprised of one or multiple items, for example, one hundred thumbnails, where each thumbnail represents a page in a one hundred page document, and the like. Since there are multiple items of the low fidelity representation of the data, the client application is able to use the low fidelity representation of the data as each item is downloaded. For example, the client application is able to use a thumbnail as soon as the particular thumbnail is downloaded, without having to wait for all of the thumbnails to be downloaded. Even though two fidelities are illustrated, one skilled in the art will appreciate that a different number of fidelities for the data may be provided. For example, a dataset may include a high fidelity (e.g., WORD), a mid fidelity (e.g., PNG image), and a low fidelity (e.g., thumbnail) representation of the same data. Moreover, the datasets may include differing numbers of representations of the same data. For example, some datasets may include a high fidelity content and a low fidelity content, while other datasets include a high, mid, and low fidelity contents.

The client application comprises a download manager 118. In general terms, the download manager determines a strategy for downloading content from the content server. In one embodiment, the download manager monitors the download performance and dynamically determines whether to provide a user of the client application a high bandwidth/high fidelity experience, or whether to provide the user a low bandwidth/low fidelity alternative until the high bandwidth/high fidelity experience becomes available. The download manager may do this by measuring and/or estimating the performance of content downloads, listening to and monitoring the state of the client application, managing the memory caches, managing the download threads, and the like.

The content server and the client application may include other components (not shown) that enable the content server and the client application to communicate and interact with each other to download content from the content server to the client application. For example, the client application and content server may include transport components that enable the client application and the content server to communicate with each other via the network by sending and receiving network protocol packets.

The network is a communications link that facilitates the transfer of electronic content between, for example, the attached computers. In one embodiment, the network includes the Internet. It will be appreciated that the network may be comprised of one or more other types of networks, such as a local area network, a wide area network, a point-to-point dial-up connection, and the like. It will also be appreciated that the network may not be present. For example, client application and the content server may both reside on the same computing system and communicate via communication mechanisms, such as, interprocess communication, remote function call, internal communication buses, etc., typically supported on the computing system.

The computer systems on which the content server, the client application and, in particular, the download manager can execute may include a central processing unit, memory, input devices (e.g., keyboard and pointing devices), output devices (e.g., display devices), and storage devices (e.g., disk drives). The memory and storage devices are computer-readable media that may contain instructions that implement the download manager and other components. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on.

Embodiments of the download manager may be implemented in various operating environments that include personal computers, server computers, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The download manager may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
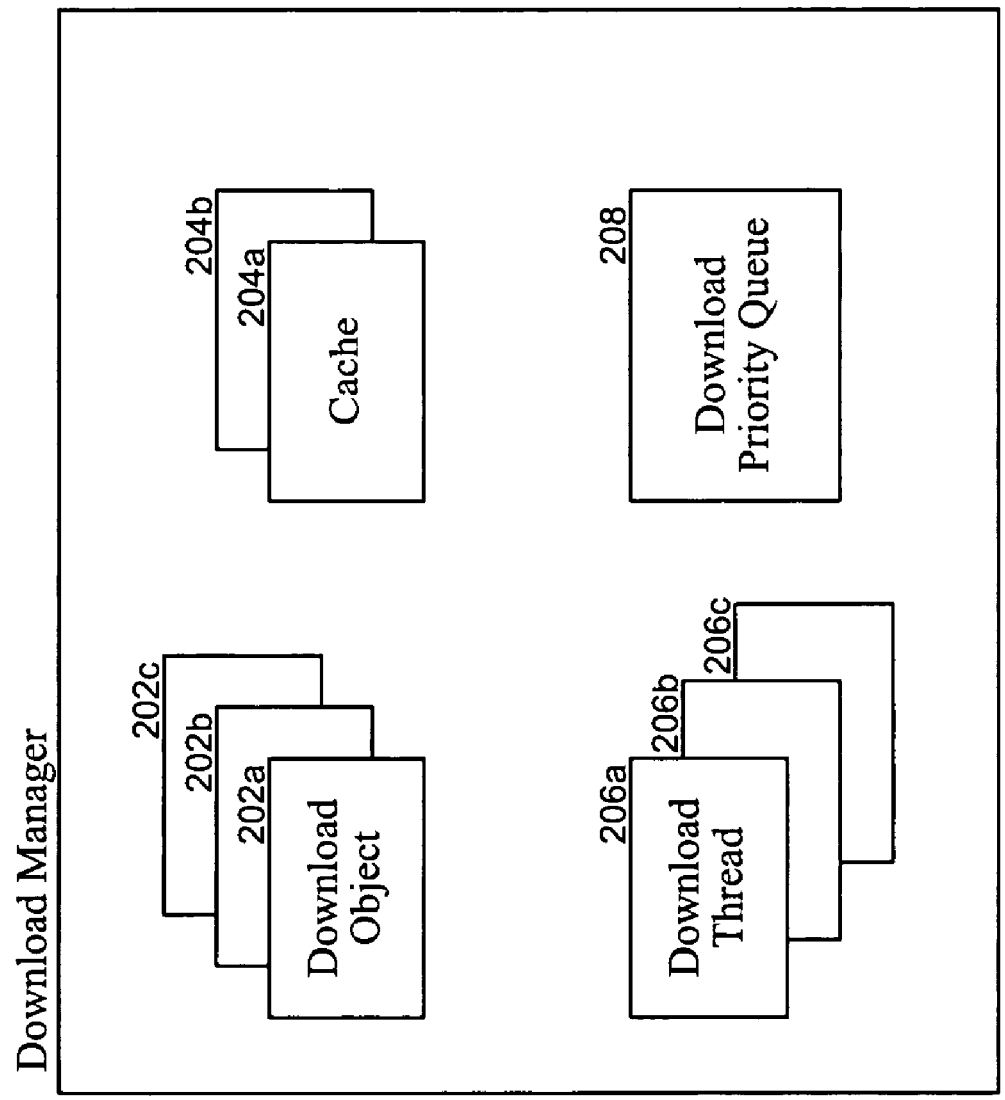
FIG. 2 is a block diagram illustrating selected components of a download manager, according to one embodiment.

FIG. 2 is a block diagram illustrating selected components of a download manager, according to one embodiment. As depicted, the download manager comprises download objects 202a-202c, memory caches 204a and 204b, download threads 206a-206c, and a download priority queue 208. Each download object represents a single document or file—i.e., a single item of content such as a high fidelity content, an item of low fidelity content, etc.—that is available from the server. The download manager creates a download object for each item of content that needs to be downloaded from the content server. Once the item of content is downloaded, the download object is used to track the corresponding item of content in the download manager's cache(s). The download manager may maintain a multiple number of memory caches. For example, the download manager may maintain a cache to keep track of the download objects that have already been downloaded or fetched from the content server. The download manager may maintain different caches to keep track of the different fidelities of content—e.g., a cache for PNG image files and another cache for thumbnails—that have been downloaded or fetched from the content server. For each cache, the download manager can keep track of the total disk or memory space used by the cache, and when it reaches a configurable limit, the download manager can purge the least recently used items in the cache to get back under the limit.

A download thread is created by the download manager, and the download thread is a worker thread that downloads content represented by a single download object from the content server. There can be one or more download threads active at any one time, and the number of download threads that the download manager can have active at any one time may be specified by a configurable parameter. The download priority queue operates as a queue for the download objects, and the order of the download objects specifies the priority or ordering of the download sequence. When the download manager determines that content needs to be downloaded from the content server, the download manager creates a download object for the content and places the download object in the download priority queue. For example, assuming that the download manager determines a priority for a download sequence as download the first PNG image, followed by the slide deck (the 5 slides) and the remaining PNG images simultaneously, the download manager creates a download object for the first PNG image in the download priority queue and activates a download thread. The activated download thread removes the download object from the download priority queue and proceeds to download the content represented by the download object—i.e., the first PNG image—from the content server. Subsequent to activating the download thread, the download manager creates a download object for the slide deck and another download object for the remaining PNG images and places these download objects in the download priority queue. The download manager then activates one or more download threads, as permitted by the configurable parameter, and each activated download thread removes the next download object from the download priority queue and proceeds to download the content represented by the download object—i.e., the slide deck, the remaining PNG images—from the content server. As long as there are download objects in the download priority queue, the download manager activates a download thread to process a download object in the priority queue. If the maximum number of allowed active download threads is reached and there still are download objects in the download priority queue, the download manager waits until an active download thread completes processing before activating another download thread.

The aforementioned components of the download manager are only illustrative, and the download manager may include other components and modules not depicted. Furthermore, the functionality provided for in the components and modules may be combined into fewer components and modules or further separated into additional components and modules.

Figure 3:
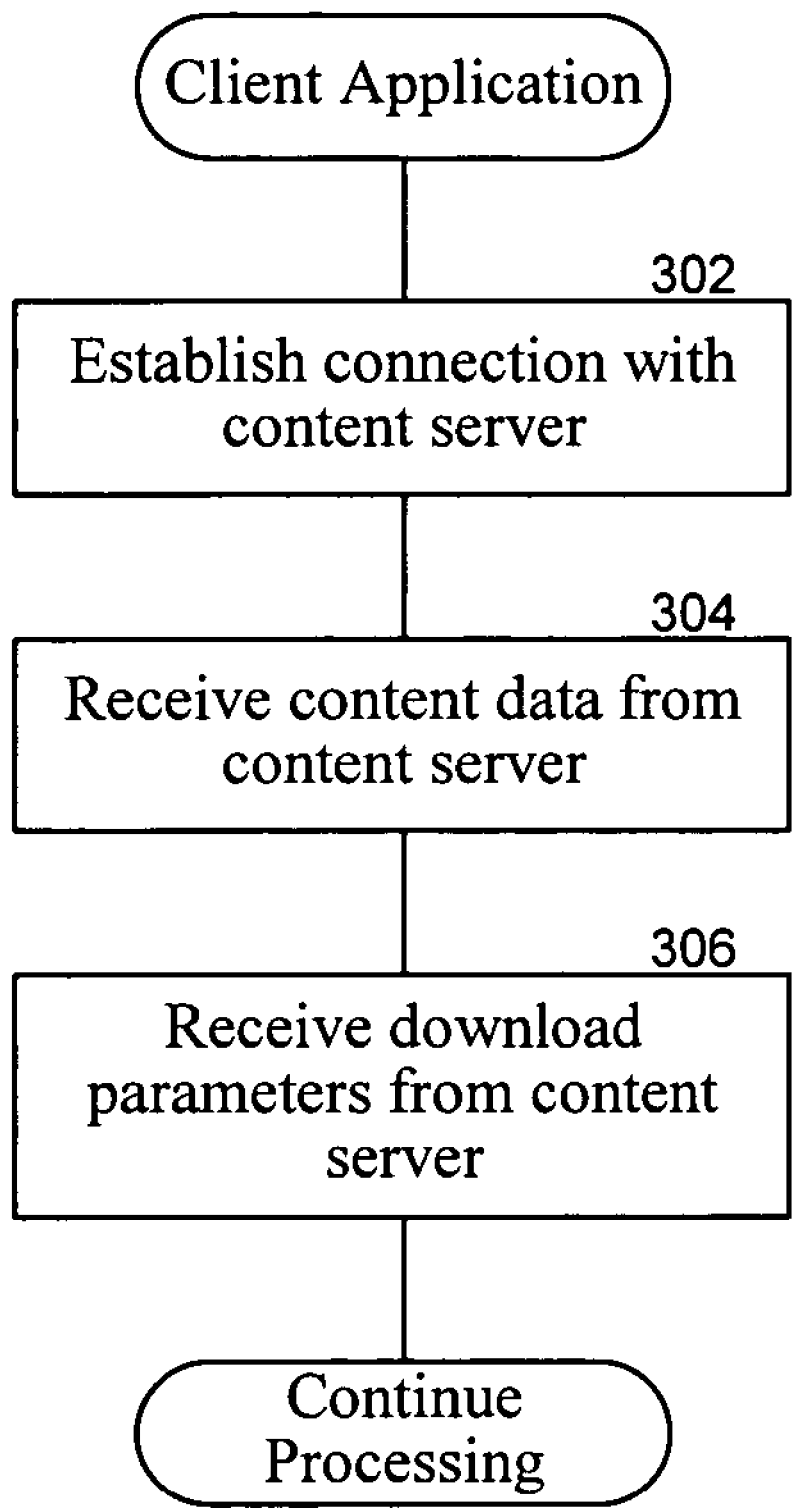
FIG. 3 is a flow diagram illustrating the processing of a client application, according to one embodiment.

FIG. 3 is a flow diagram illustrating the processing of a client application, according to one embodiment. By way of example, the client application may be a collaboration application executing on a user's computing device, and a collaboration server application may be executing on the content server. In block 302, the client application establishes a connection—i.e., a communication channel—with the content server and, in particular, the server application executing on the content server. Continuing the example, the collaboration application may connect to the server application and request to join a scheduled collaboration session. In block 304, the client application receives the content data from the content server. Continuing the collaboration example, upon the client application joining the collaboration session, the server application may determine the datasets that are to be used in the collaboration session and download the content data corresponding to the datasets to the client application. In another embodiment, the client application can request from the server application the content data corresponding to a data set, for example, prior to actually downloading the low fidelity content and/or the high fidelity content. For example, the client application can request to download the content data upon receiving a request to download the corresponding content from the user of the client application. In block 306, the client application receives the download parameters from the content server, and the client application continues processing. Continuing the collaboration example, the download parameters are provided by the server application, and comprise parameters that the download manager is to use in determining what representations—i.e., low fidelity, mid fidelity, high fidelity, etc.—of the content to download from the content server and the priority in which the download manager is to download the representations of the content.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps without detracting from the essence of the invention.

Figure 4:
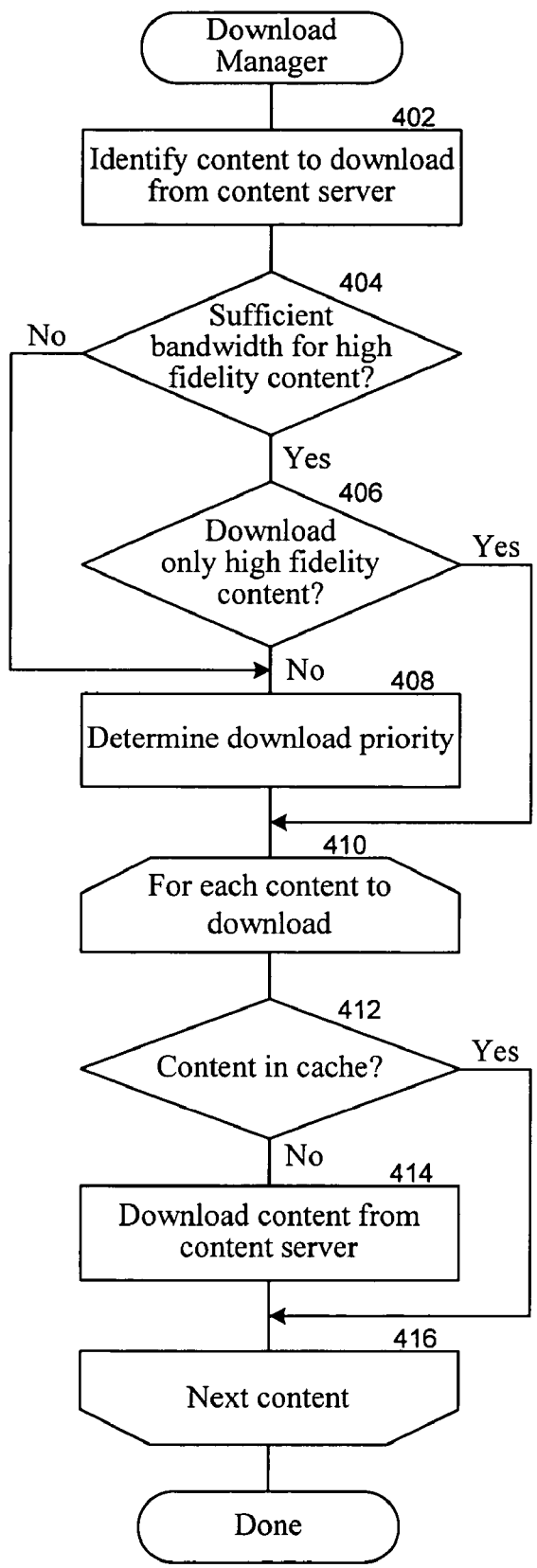
FIG. 4 is a flow diagram illustrating the processing of a download manager of the client application, according to one embodiment.

FIG. 4 is a flow diagram illustrating the processing of a download manager of the client application, according to one embodiment. Continuing the collaboration example, upon joining the collaboration session, the server application may have requested the client application to download a slide presentation provided on the content server. The slide presentation may be a MICROSOFT POWERPOINT slide deck with 50 slides (high fidelity) and 50 PNG images (low fidelity) representing the 50 slides. In block 402, the download manager identifies the content to download from the content server. In block 404, the download manager checks to determine if there is sufficient bandwidth to download the high fidelity content. Continuing the collaboration example, one of the download parameters may have specified a minimum connection bandwidth (kB/sec) that is necessary for the high fidelity content to be downloaded. The download manager can compare the bandwidth of the connection between the client application and the content server with this parameter to determine whether the POWERPOINT slide deck should be downloaded.

If the download manager determines that there is sufficient bandwidth to download the high fidelity content, then, in block 406, the download manager checks to determine if it should only download the high fidelity content and not the low fidelity content. In one embodiment, the download manager may not download the low fidelity content if the size of the high fidelity content is only marginally or slightly bigger than one item of the low fidelity content. Continuing the collaboration example, another one of the download parameters may have specified a weighting factor that specifies the amount by which the high fidelity content needs to exceed the first low fidelity content in size in order to download both the low and high fidelity content. The size of the POWERPOINT slide deck and the PNG images were previously received by the client application as part of the content data. The download manager can compare the size of the POWERPOINT slide deck and the size of one PNG image to determine whether the size differential is such that both the slide deck and the PNG images should be downloaded.

If the download manager determines that both the low fidelity content and the high fidelity content are to be downloaded, or determines that the bandwidth is not sufficient to download the high fidelity content (block 404), then, in block 408, the download manager determines the download priority. In one embodiment, the download manager utilizes some or all of the use factors and the download parameters to determine the download priority. Continuing the collaboration example, the download manager may have determined from the client application that slide 6 is to be displayed/shown. Moreover, a download parameter may indicate that a maximum of 5 items of the low fidelity content are to be downloaded before starting the download of the high fidelity content. In this instance, the download manager may determine the download priority as follows: download the five PNG images of slides 6-10, followed by the slide deck and the remaining PNG images simultaneously.

Subsequent to determining the download priority, or determining that only the high fidelity content is to be downloaded (block 406), the download manager performs blocks 410 to 416 for each content to download from the content server. Beginning with the highest priority content—i.e., the first content—to download, the download manager checks its cache to determine if a local copy of the content is in cache memory (block 412). If a local copy of the content is in cache memory, then the download manager provides the client application the local copy of the content from cache memory, and proceeds to download the next highest priority content. If a local copy of the content is not in cache memory, the download manager downloads the content from the content server (block 414). In this manner, the download manager downloads the content from the content server according to the determined download priority.

Continuing the collaboration example, the download manager can check to determine if a local copy of the five PNG images of slides 6-10 are in cache memory. If there is a local copy of the five PNG images of slides 6-10 in cache memory, the download manager can provide the client application the copy of the five PNG images of slides 6-10 from the cache memory. If a local copy does not exist, the download manager can create a download object for the five PNG images of slides 6-10, and place the download object in the download priority queue. The download manager can then activate a download thread to process the downloading of the five PNG images of slides 6-10. Upon activating the download thread, the download manager can process the downloading of the slide deck and the remaining PNG images in similar fashion. When the five PNG images of slides 6-10 are downloaded, the download manager provides the downloaded images to the client application. The client application can then use the PNG images of slides 6-10, for example, to display slide 6 to the user. Subsequently, the client application may receive a command to display slide 10. In response, the client application can first check to see if the entire slide deck has been downloaded, and if it has, the client application can display slide 10 from the slide deck. Otherwise, the client application can display the PNG image of slide 10. When the slide deck finishes downloading, the client application can replace the PNG image of slide 10 with the slide 10 from the slide deck. In this manner, the client application uses the high fidelity content whenever possible, and provides the low fidelity alternative until the high fidelity representation until the higher fidelity experience becomes available.

In some embodiments, the download manager may only maintain copies of the low fidelity content in cache memory. In still other embodiments, the download manager may not maintain any local copies of the downloaded content.

In one embodiment, the download manager may monitor the downloading of the content and cancel and terminate the downloading of the low fidelity representation of the content if the high fidelity representation of the content is downloaded and available for use by the client application. Continuing the collaboration example, assuming that the slide deck has been downloaded and the remaining PNG slides are still being downloaded or yet to begin downloading, the download manager can terminate the download thread that is currently downloading the remaining PNG slides or remove the download object for the remaining PNG slides from the download priority queue.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A method in a client application of a client computing device for providing a low fidelity representation of data until a high fidelity representation of the same data becomes available, the method comprising:

establishing a communication channel between the client computing device and a content server providing datasets for download by the client computing device, wherein a dataset represents data and comprises at least a low fidelity representation of the data and a high fidelity representation of the data, the low fidelity representation of the data being divided into portions such that when a portion is received the portion can be used without having to wait until the other portions of the low fidelity representation of the data is received, the high fidelity representation of the data not being divided into portions such that the high fidelity representation of the data cannot be used until all the high fidelity representation of the data is received; and upon detecting a need to download data from the content server, determining by the client computing device a download priority for downloading the low fidelity representation of the data and the high fidelity representation of the same data wherein the low fidelity representation of a portion of the data is given a higher priority than the high fidelity representation of the entire data and the low fidelity representation of another portion of the data is given a lower priority than that high fidelity representation of that data;

requesting the content server to download to the client computing device the low fidelity representation of the data and the high fidelity representation of the data in the determined download priority; and receiving at the client computing device the low fidelity representation of the data and the high fidelity representation of the data, wherein the client application uses the low fidelity representation of the data until the high fidelity representation of the data is downloaded and wherein the portion of the low fidelity representation of the data with the lower priority and the high fidelity representation of the data are downloaded simultaneously such that when the low fidelity representation of the data with the lower priority is downloaded before the high fidelity representation of the data with the higher priority, the low fidelity representation of the data with the lower priority is used before the high fidelity representation of the data with the higher priority.

2. The method of claim 1, wherein the high fidelity representation of the data is downloaded only if the communication channel exceeds a predetermined bandwidth.

3. The method of claim 1, wherein the low fidelity representation of the data is downloaded only if the difference in size between an item of low fidelity content representing the data and the high fidelity representation of the data exceeds a predetermined value.

4. The method of claim 1 further comprising, prior to downloading the low fidelity representation of the data, determining if there is local copy of the low fidelity representation of the data and downloading the low fidelity representation of the data if a local copy of the low fidelity representation of the data does not exist.

5. The method of claim 1, wherein the download priority is determined at least in part from a use factor.

6. The method of claim 1, wherein the download priority specifies an amount of the low fidelity representation of the data to download prior to starting the download of the high fidelity representation of the data.

7. The method of claim 1, wherein the high fidelity representation of the data is non-streamable.

8. The method of claim 1 further comprising, upon downloading of the high fidelity representation of the data, canceling the downloading of the low fidelity representation of the data.

9. The method of claim 1, wherein the dataset further comprises a third fidelity representation of the data.

10. A client computing system for providing a low fidelity representation of data until a high fidelity representation of the same data becomes available, the system comprising:

a memory storing a communications component with computer-executable instructions that establishes a communication channel to a content server that provides datasets for download by the computing system, wherein a dataset represents data and comprises at least a low fidelity representation of the data and a high fidelity representation of the data, the low fidelity representation of the data being divided into portions such that when a portion is received the portion can be used without having to wait until the other portions of the low fidelity representation of the data is received, the high fidelity representation of the data not being divided into portions such that the high fidelity representation of the data cannot be used until all the high fidelity representation of the data is received; and a download manager component with computer-executable instructions that detects a need to download data from the content server, and upon detecting the need to download data, determines a download priority that specifies an amount of the low fidelity representation of the data to download prior to downloading the high fidelity representation of the same data and any remaining low fidelity representation of the data, wherein the specified amount of low fidelity representation of the data is given a higher priority than the high fidelity representation of the data and the remaining low fidelity representation of the data is given a lower priority than that high fidelity representation of that data; and downloads the low fidelity representation of the data and the high fidelity representation of the data according to the download priority wherein the client computing system uses the low fidelity representation of the data until the high fidelity representation of the data is downloaded and wherein the remaining low fidelity representation of the data with the lower priority and the high fidelity representation of the data are downloaded simultaneously such that when the remaining low fidelity representation of the data with the lower priority is downloaded before the high fidelity representation of the data with the higher priority, the remaining low fidelity representation of the data with the lower priority is used before the high fidelity representation of the data with the higher priority; and a processor that executes the computer-executable instructions of the components.

11. The client computing system of claim 10, wherein the download manager component further terminates the downloading of the remaining low fidelity representation of the data upon completing the download of the high fidelity representation of the data.

12. The client computing system of claim 10, wherein the download manager uses a download priority queue to establish the download priority.

13. The client computing system of claim 10, wherein the download manager maintains a local copy of the low fidelity representation of the data.

14. The client computing system of claim 10, wherein the download priority is determined in part by applying a weight to the low fidelity representation of the data and the high fidelity representation of the data based on the use of the data.

15. The client computing system of claim 10, wherein the high fidelity data is non-streamable.

* * * * *

UNITED STATES PATENT AND TRADEMARK OFFICE
CERTIFICATE OF CORRECTION

PATENT NO. : 7,664,870 B2  Page 1 of 1
APPLICATION NO. : 11/067596
DATED : February 16, 2010
INVENTOR(S) : Baek et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1008 days.

Signed and Sealed this

Twenty-eighth Day of December, 2010

David J. Kappos
*Director of the United States Patent and Trademark Office*